April 8, 1952 W. M. ZAIKOWSKY 2,591,762
GAS ANALYSIS APPARATUS
Filed June 14, 1946 2 SHEETS—SHEET 1
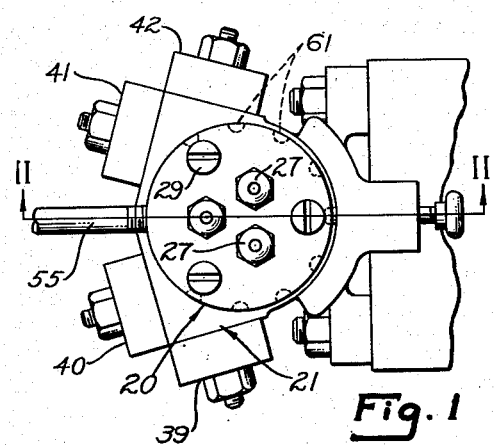
Fig. 1
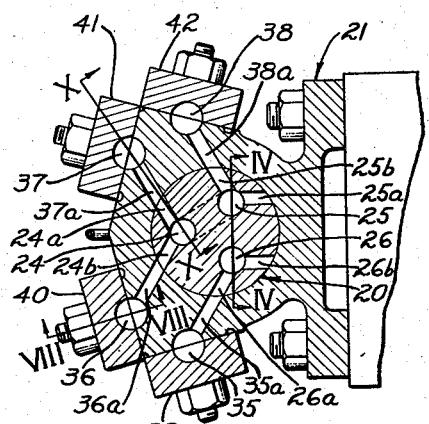
Fig. 3
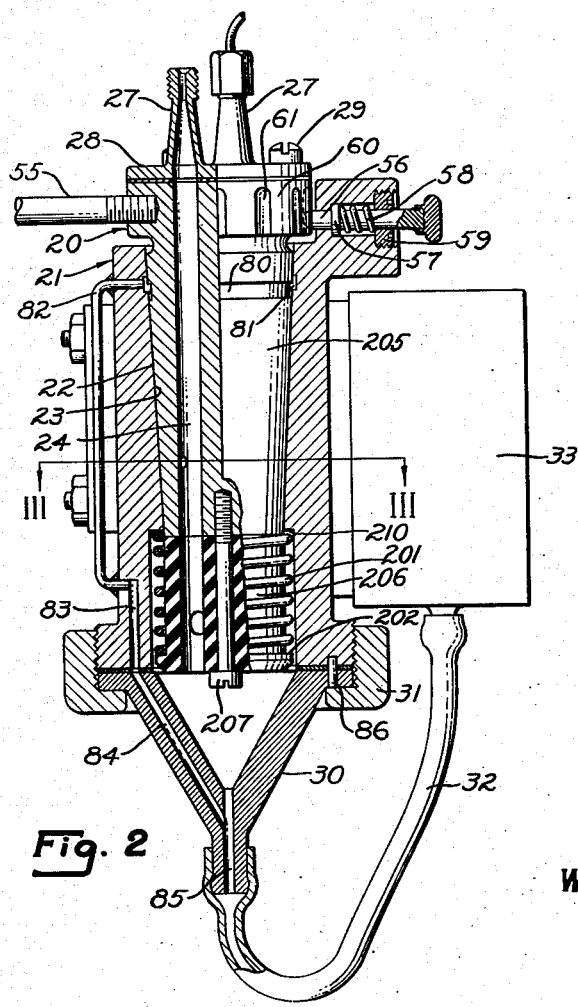
Fig. 2
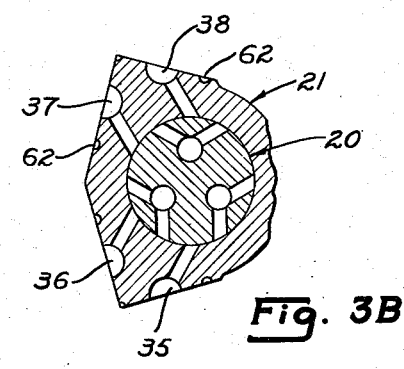
Fig. 3A
Fig. 3B
INVENTOR.
WLADIMIR M. ZAIKOWSKY
BY EMWoodbury
ATTORNEY April 8, 1952 W. M. ZAIKOWSKY 2,591,762
GAS ANALYSIS APPARATUS
Filed June 14, 1946 2 SHEETS—SHEET 2
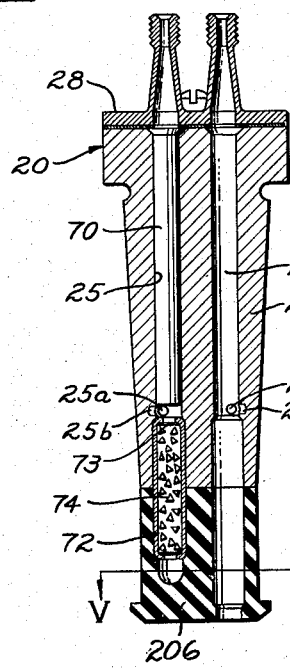
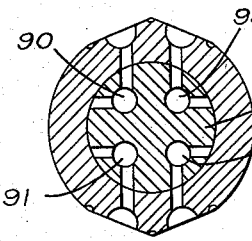
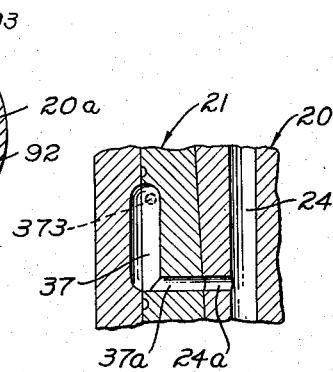
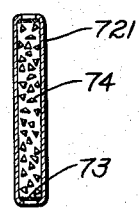
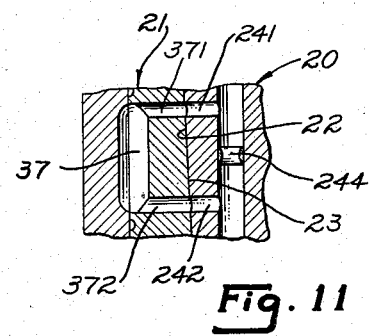
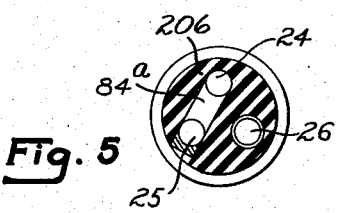
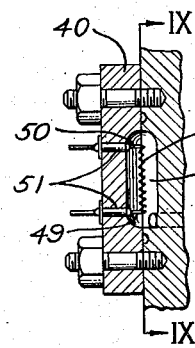
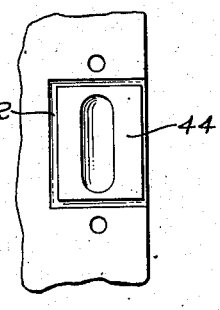
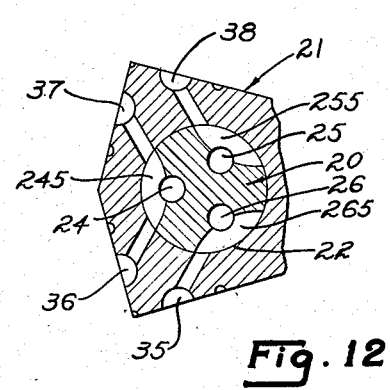
INVENTOR.
WLADIMIR M. ZAIKOWSKY
BY
*EHWoodbury*
ATTORNEY Patented Apr. 8, 1952

2,591,762

UNITED STATES PATENT OFFICE 2,591,762

GAS ANALYSIS APPARATUS

Wladimir M. Zaikowsky, Pasadena, Calif., assignor to Nina D. Zaikowsky

Application June 14, 1946, Serial No. 676,820

13 Claims. (Cl. 73—27)

This invention relates to gas analysis apparatus of the type in which gas is diverted from a gas stream to a test cell, and it is particularly useful in apparatus employing test cells containing heated, temperature-sensitive means. More specifically, the invention has to do with the apparatus elements defining the channels or passages through which the gas streams to be analyzed are conducted, the test cells, and the passages through which the gas is diverted from the gas streams to the test cells.

An object of the invention is to provide such apparatus that is adapted for use in practicing gas analysis by several different methods of procedure.

Another object is to provide such apparatus in which the same test cell can be selectively connected to any one of a plurality of gas channels or the same gas channel can be selectively connected to any one of a plurality of test cells.

Another object is to provide apparatus for successively delivering different gases to the same test cell in such a manner that the error resulting from contamination of a succeeding gas by the residue of a preceding gas retained by the walls of the passages is reduced or eliminated.

Another object is to provide apparatus capable of selectively either directing gas from two streams into separate cells or directing gas from either stream into both cells whereby greater accuracy of zero calibration can be obtained or an abnormal condition in one cell can be detected.

Another object is to provide apparatus for simultaneously supplying three or more different gases to four or more different cells.

Another object is to provide apparatus for successively directing gas from any one of a plurality of flow channels into a single cell, in which the length of the common passage to the cell can be made negligibly small.

Another object is to provide apparatus in which a test cell can be selectively connected to and disconnected from a gas channel without interrupting the flow through the channel, whereby the gas within the cell can be made quiescent. This is particularly important when the gas is normally flowed through the cell or when it is desired to preserve a particular gas sample in the cell for a period of time.

Another object is to provide apparatus which is readily adaptable to either compare different gases from a plurality of separate sources or to compare a plurality of different gas samples derived from a single gas stream.

Another object is to provide apparatus which can be manipulated to selectively produce diffusion paths offering either similar or different resistances to diffusion of the gas between a gas stream and different test cells.

Another object is to provide apparatus of the type referred to which is practicable to manufacture, easy to manipulate, and is easily serviced and maintained in operative condition.

Another object is to provide apparatus which is adapted for operation at sub-ambient pressures.

Another object is to facilitate the treatment of a gas being tested with suitable agents for altering its composition in a desired manner.

Normally, apparatus in accordance with the invention comprises a pair of members, one of which contains one or more test cells, and the other of which contains one or more flow channels through which gas to be analyzed is conducted, in which the two members have contacting, sealing surfaces relatively movable with respect to each other in gas-tight relation, and cooperate to interconnect different ones of the gas channels with different ones of the cells in different relative positions of the members.

Specific details of certain preferred constructions together with various other objects and features of the invention will become apparent from the detailed description to follow with reference to the drawing in which:

Fig. 1 is a plan view of a gas analysis unit in accordance with the invention;

Fig. 2 is a longitudinal section through the unit of Fig. 1, the section being taken in the plane II—II of Fig. 1;

Fig. 3 is a cross-section taken in the plane III—III of Fig. 2;

Fig. 3A is a detail cross-section taken in the same plane as Fig. 3 but showing the inner member in a different position of rotation;

Fig. 3B is a detail section similar to Fig. 3A but showing the inner member in still another position of rotation;

Fig. 4 is a longitudinal section through the inner member of the apparatus, the section being taken in the plane IV—IV of Fig. 3;

Fig. 5 is a cross-section taken in the plane V—V of Fig. 4;

Fig. 6 is a longitudinal section through a treating cartridge that can be inserted in the inner member of Fig. 4;

Fig. 7 is a bottom end view of the cartridge that is shown in longitudinal section in Fig. 6;

Fig. 8 is a detail section taken in the plane VIII—VIII of Fig. 3;

Fig. 9 is a face view of a portion of the apparatus with the cover plate removed, the view being taken in the plane IX—IX of Fig. 8;

Fig. 10 is a detail vertical section taken in the plane X—X of Fig. 3;

Fig. 11 is a detail vertical section similar to Fig. 10 but showing a modified construction;

Fig. 12 is a detail cross-section taken in the same plane as Fig. 3 but showing a modified construction; and Fig. 13 is a detail section similar to Fig. 3A but showing a structure having four channels in the inner member instead of three.

As previously indicated, apparatus in accordance with the invention preferably comprises two relatively movable members, which in this instance consist of an inner member 20 and a outer member 21, assembled in the same general manner as are the inner and outer members of a plug valve. Thus, the inner member 20, as shown in Fig. 2, has a conical outer contact surface 22 which fits in sealing relation with a conical inner contact surface 23 in the outer member 21. The surfaces 22 and 23 are accurately formed to seal with each other in various positions of rotation, so that the inner and outer members can be relatively rotated to effect different connections, as will be described later, while maintaining a gastight joint between the members. A helical spring 201 compressed between a shoulder 210 on the outer member 21 and a shoulder 202 on the inner member 20 may be used to maintain engagement between the members 20 and 21. It it to be understood, however, that the spring 201 is not always necessary and it can be dispensed with, particularly when a sub-ambient pressure is maintained at the lower end of the inner member 20 and the latter is supported by the outer member 21.

The inner member 20 defines three longitudinal flow channels 24, 25 and 26 for the passage of gas to be tested. Gas may be supplied separately to the upper ends of the three channels 24, 25 and 26 through separate inlet connections 27, which are adapted to be connected by known type connections to conduits leading either from the same or different gas sources. The three inlet connections 27 are shown formed integrally with an end plate 28, which is adapted to be secured against the upper end of the inner member 20 in gas-tight relation therewith, as by screws 29.

In operation, gas may be exhausted from the lower end of one or more of the channels 24, 25 and 26, to which connection is effected by closing the lower end of the outer member 21 with a cap 30, the large end of which is held against the lower end of the outer member 21 in sealing relation therewith by a nut element 31, which is threaded onto the lower end of the outer member 21. The small end of the transition member 30 is shown connected by a piece of flexible tubing 32 to a pumping unit 33, which is shown as mounted on one side of the outer member 21.

It is to be understood that normally it is desirable to maintain the gas in the channels 24, 25 and 26 at a sub-ambient pressure, which is obtained by means of a suction pump and flow-restricting means, not shown. However, if it is not necessary to maintain the gas at sub-ambient pressure, the suction pump can be dispensed with, and in some instances the cap 30 can be dispensed with, permitting the discharged gases to vent from the lower ends of the channels 24, 25 and 26 directly to the atmosphere. Systems employing such flow restricting means and suction pumps together with diffusion cells are disclosed and claimed in my copending patent application Serial No. 477,675 filed March 1, 1943.

Each of the flow channels 24, 25 and 26 (Fig. 3) is adapted to be connected through diffusion passages with any one, or any pair, of a plurality of test cells 35, 36, 37 and 38, which are formed in the outer member 21. To this end, there are provided, in a common transverse plane a plurality of inner diffusion passages leading from the flow channels 24, 25 and 26 to the contact surface 22 of the inner member 20, and a plurality of outer diffusion passages extending from the test cells 35, 36, 37 and 38 to the contact surface 23 of the outer member 21.

Thus, as shown in Fig. 3, there are two inner diffusion passages 24a and 24b extending from the channel 24, two inner diffusion passages 25a and 25b extending from the flow channel 25, and two inner diffusion passages 26a and 26b extending from the flow channel 26. The orifices or ports at the outer ends of these passages are angularly spaced 60° apart in the contact surface 22.

There is one outer diffusion passage associated with each of the test cells and extending therefrom to the contact surface 23 of the outer member; each outer diffusion passage bearing the same reference numeral as its associated test cell with the suffix $a$. The inner ends of the outer diffusion passages 35a and 36a, 37a and 38a are spaced apart 60° along the contact surface 23 of the outer member, so as to register with the outer ends of the desired inner diffusion passages in predetermined positions of relative rotation between the inner and outer members.

It will be observed that the arrangement of the diffusion passages makes it possible to connect the flow channels 24, 25 and 26 to the test cells 35, 36, 37 and 38 in many different ways. Thus, as shown in Fig. 3, the flow channel 24 is connected to both the test cell 36 and the test cell 37, while the flow channel 25 is connected only to the test cell 38, and the flow channel 26 is connected only to the test cell 35. On the other hand, by rotating the inner member 20 clockwise through an angle of 60° with respect to the outer member 21, connections are made as shown in Fig. 3A, in which the flow channel 24 is connected to both the test cells 37 and 38, the flow channel 26 is connected to both test cells 35 and 36, and the flow channel 25 is isolated from the test cells. It will be readily apparent that by successively rotating the inner member with respect to the outer member in 60° increments, six different connections between the flow channels and the test cells can be had. Also, as shown in Fig. 3B, by a rotation of 30°, all the cells can be isolated from the flow channels.

The test cells are arranged in pairs, cells 35 and 36 constituting one pair, and cells 37 and 38 constituting the other pair. It will be observed that each of the cells consists of a chamber substantially cylindrical in shape, which is half defined by a recess in a plane surface 44, in the outer member and half by a registering semi-cylindrical recess in the associated cover plate 39, 40, 41 or 42.

Each of the plane surfaces 44 (Fig. 9) contains a groove 62 into which a suitable sealing compound can be poured after the cover plate has been screwed in place, to effect a gas-tight seal with the cover plate.

As best shown in Fig. 8, each cell may have a resistor or filament (36f in the case of cell 36)

supported by lead-in wires 49 and 50 at opposite ends thereof, which lead-in wires extend through and are supported by insulating seals 51 in the associated cover plate. In accordance with established practice, the resistors in the various cells may be of a material which varies its electrical resistance with a change in temperature, and the resistors of the various cells may be connected in a Wheatstone bridge circuit so that changes in the temperatures of the filaments caused by different gases in the different cells can be measured.

As has been previously indicated, either the inner member 20 or the outer member 21 can be maintained stationary, and the other rotated. The inner member 20 may have a member 55 secured thereto, which member may function as a handle for facilitating rotation of the inner member when the outer member is stationary, or may be used as a support for the inner member when the outer member is the one that is rotated.

To facilitate stopping of the members in the relative positions in which the inner diffusion passages register with the outer diffusion passages, a detent mechanism can be employed which, as shown in Fig. 2, comprises a plunger 56 having a shoulder 57 thereon, with a helical compression spring 58 compressed between the shoulder 57 and a closure nut 59, for urging the plunger 56 inwardly against a cylindrical surface 60 adjacent the upper end of the inner member 20. This cylindrical surface 60 is provided with nine equally spaced recesses 61, so oriented that when the plunger 56 engages in any one of the recesses, the inner and outer members are so relatively positioned as either to align some or all of the outer diffusion passages with desired ones of the inner diffusion passages, or to isolate some or all of the passages.

As is readily apparent from inspection of Figs. 3 and 3A, the plane surfaces 44 associated with each pair of adjacent cells intersect at an angle of approximately 90°, to form an edge or corner extending parallel to the axis of rotation of the inner and outer members. Furthermore, each pair of surfaces 44—44 are symmetrically disposed with respect to the axis of rotation, so that all of the outer diffusion passages 35a, 36a, 37a and 38a are equal in length. The arrangement of each adjacent pair of plane surfaces 44—44 in angular relation to each other is advantageous, in that it permits the two cells of each pair to be placed close together. This is desirable because it makes it easier to maintain the two cells of each pair at the same temperature.

As so far described, the apparatus can be used for comparing two or three different gases by conducting them through two or all of the three flow channels 24, 25 and 26.

It is, of course, not necessary to employ all of the cells or all of the flow channels simultaneously. For instance, only the two cells 37 and 38 may be employed, and two gases to be compared can be conducted through the two flow channels 24 and 25, with the apparatus adjusted into the position shown in Fig. 3. Either prior to, during, or following comparison of the gases with the apparatus arranged as shown in Fig. 3, the inner and outer members can be relatively rotated 60° into a position like that shown in Fig. 3A, in which the gas flowing through the flow channel 24 is migrated to both the cells 37 and 38 to permit balancing of the circuit in which the cell resistors are connected.

As another example, the apparatus can be adjusted into the position shown in Fig. 3, and one gas supplied to the flow channel 24 and another gas supplied to both the flow channels 25 and 26. The cells 37 and 36 will then be exposed to the one gas in channel 24, and the cells 38 and 39 will be exposed to the other gas which is traversing the flow channels 25 and 26. The respective resistors of the two cells 37 and 36 can then be connected in two aiding arms of a Wheatstone bridge, and the respective resistors of the two cells 35 and 38 connected in the other two arms of the bridge, as explained, for example, in my copending patent application Serial Number 477,675, filed March 1, 1943. When the apparatus is to be calibrated, the members can be relatively rotated through 60° in either direction, thereby delivering the same gas to the pair of cells 35 and 36 and the same gas to the pair of cells 37 and 38.

If the inner member is rotated 60° counterclockwise with respect to the outer member, the one gas in the channel 24 will be delivered to the two cells 35 and 36, and the other gas in the channels 25 and 26 will be delivered to the cells 37 and 38. If the inner member is rotated 60° clockwise with respect to the outer member, the one gas in the channel 24 is delivered to the two cells 37 and 38, and the other gas in channels 25 and 26 is delivered to the other two cells 35 and 36. This permits the use of two different gases for the calibration of each pair of cells, which is important in many instances.

It is to be understood that when different gas samples are conducted through different ones of the flow channels 24, 25 and 26, the different samples can be derived in any desired manner from any desired source. Thus, as disclosed in my co-pending application, Serial No. 477,675, filed March 1, 1943, it is sometimes desirable to compare exhaust gas that has been treated by passage over hot carbon, with exhaust gas that has been treated by passage over hot copper oxide, or to compare exhaust gas (either treated by either process or untreated) with air or other reference gas.

The present apparatus can be utilized for comparing exhaust gas that has been treated by passage over hot carbon with exhaust gas that has been treated by passage over hot copper oxide as follows: With the apparatus as shown in Fig. 3, exhaust gas treated with copper oxide can be admitted to channel 24, and exhaust gas treated with carbon can be admitted to channels 25 and 26. The resistors of cells 36 and 37 will then be exposed to exhaust gas treated with copper oxide and be connected in aiding arms of a bridge circuit, whereas the resistors in cells 35 and 38 will be exposed to exhaust gas treated with carbon and will be connected in the other two arms of the bridge.

The present apparatus can be utilized for comparing either untreated exhaust or treated exhaust with air as follows: Untreated exhaust gas can be admitted to the channel 25, treated exhaust can be admitted to the channel 26, and air can be admitted to the channel 24. With the apparatus in the position shown in Fig. 3, the resistor in cell 38 will then be exposed to untreated exhaust, the resistor in cell 35 will be exposed to treated exhaust, and the resistors in both cell 36 and cell 37 will be exposed to air. The resistors of cells 37 and 38 can be connected in one bridge circuit for comparison of the untreated exhaust gas with air, and the resistors of cells 35 and 36 can be connected in an another bridge circuit for comparison of the treated exhaust with air.

In either case, the zero calibration of the apparatus can be readily made by relative rotation of the inner and outer members through 60°, to deliver the same gas to opposing cells.

It will be apparent, therefore, that the apparatus is adaptable for use in making a large variety of tests in which different gas samples are flowed through the different flow channels 24, 25 and 26. As will appear later, the apparatus is particularly useful for integration into a single reading of the effects produced by three different gases.

The apparatus is also adaptable for the indication of a change in composition of a gas which changes its diffusion rate, and is adaptable for the practice of methods such as disclosed in my application, Serial No. 616,789, filed September 17, 1945, now abandoned, which involve the treatment of one sample of the gas by diffusion through a treating agent.

The apparatus disclosed is convertible into condition for the practice of these additional methods, by blocking the entry end of one or two of the flow channels so that gas can enter the blocked channel or channels only by back diffusion thereto from the channel through which gas is flowing.

One or two of the flow channels can be partially blocked by means of a plug 70, as shown in Fig. 4, which is insertable into the upper end of the flow channel by removal of the cover plate 28. The plug 70 is dimensioned to snugly fit in the flow channel, and is of such length as to block the channel immediately above the transverse plane of the diffusion passages (25a and 26b as shown in Fig. 4) so that throughflow past the diffusion passages is blocked in the plugged flow channels. However, gas can circulate by diffusion from the flow channel 24 back up through the unblocked portion of the flow channel 25, and thence through the diffusion passages into a cell or cells. As an example of such operation, referring to Figs. 4 and 5, let it be assumed that a gas is continually flowing downwardly through the open flow channel 24, but that the upper portion of the flow channel 25 is blocked by the plug 70. The flow of gas through the flow channel 24 causes a continuous change of gas at the inner orifices of the diffusion passages 24a and 24b (Fig. 3) and only a relatively short time is required for an inter-change of gas by diffusion through said passages to the test cells connected thereto. However, in order for the gas to reach the test cells connected to the diffusion passages 25a and 25b, the gas must diffuse from the channel 24 through a transverse passage 84a (Fig. 5) into the channel 25 and up through the lower portion of the flow channel 25 (which may contain a cartridge 72 filled with an inert, granular material), and thence through the diffusion passages 25a and 25b to the cells connected thereto. It, therefore, requires a longer time for the gas flowing through the flow channel 24 to diffuse to the test cells connected to diffusion passages 25a and 25b, than to the test cells connected to the diffusion passages 24a and 24b.

So long as there is no change in the composition of the flowing gas, the composition of the gas in the test cells 37 and 38 will be the same. However, let it be assumed that the composition of the gas flowing through the flow channel 24 changes. Because of the shorter diffusion path including the inner diffusion passage 24a, as compared to the diffusion path including the transverse passage 84, the lower end of the flow channel 25, and the diffusion passage 25b, the gas of changed composition will reach the test cell 37 associated with the diffusion passage 24a before it reaches the test cell 38 connected to the diffusion passage 25b, thereby upsetting the balance between the cells 37 and 38 and indicating that a change in composition of the gas stream has occurred.

The foregoing effect of a change in gas composition is transient in effect and is accentuated by the increase in the resistance to diffusion through the lower portion of the blocked flow channel (25 in this case) by the introduction of the cartridge 72 into the lower end of the passage below the diffusion passages 25a and 25b. The cartridge 72 can have continuous side walls but be closed at the upper and lower ends by gauze 73, as indicated in the end view of Fig. 7, and can be filled with some granular material 74 through which diffusion of gas proceeds relatively slowly.

As shown in Figs. 2 and 4, the inner member 20 is made in two parts, a main part 205 which has the surface 23 sealing with the surface 22 of the outer member 21, and an extension 206, which is shown secured to the main part 205 by a screw 207. The extension 206 can be made of hard rubber or plastic or any other material that is inert to any reagents that may be used. The extension 206 is not always necessary and is sometimes desirably dispensed with. However, it facilitates the assembly of the cartridge 72 with the inner member 20. As best shown in Fig. 4, the lower end of that portion of the channel 25 within the port 205 below the diffusion passages 25a and 25b is slightly enlarged, and the upper end of that portion of the channel 25 in the extension 206 is similarly enlarged.

The cartridge 72 is dimensioned laterally to fit snugly within the enlarged portion of the channel 25 and is of such length as to abut against the shoulders defined by the opposite ends of the enlarged portion of the channel. This retains the cartridge in proper vertical position, with its upper end immediately below the diffusion passages 25a and 25b. By snugly fitting the cartridge 72 in the enlarged portion of the channel 25, leakage of gas around the cartridge is prevented. Furthermore, if desired, the extension 206 can be omitted and the cartridge 72 retained in position within the enlarged portion of the channel 25 in the part 205 solely by friction.

As shown in Figs. 4 and 5, the lower end of the channel 25 in the extension 206 is connected to the channel 24 above the lower end of the extension, by the transverse passage 84. As will be described later, it is sometimes desirable to employ a reagent as the granular material 74 in the cartridge 72 to alter the gas during its diffusion through the cartridge. Furthermore, it is sometimes desirable to employ two reagents in two closed flow channels. Thus, as shown in Fig. 4, a portion of the channel 26 is enlarged for the insertion of a second cartridge 721 (Fig. 6) for treating a gas diffusing from the lower end of the channel 26 back up to the diffusion passages 26a and 26b (it being understood that under such circumstances the upper portion of the channel 26 will be blocked by a plug 70 the same as passage 25 is shown blocked in Fig. 4).

With the assembly last described, gas would be flowed only through the channel 24, and some of this gas would diffuse through the transverse passage 84 into the lower end of the channel 25, and some of the gas would diffuse from the space below the extension 206 into the lower end of the channel 26.

It is desirable that the gas diffuse from the channel 24 through the transverse passage 84 into the channel 25 at a point in the channel 24 above the lower end of the extension 206, to prevent the entry of gas that has been treated by the reagent in the cartridge 72I (in channel 26) from getting into the channel 25. Thus, diffusion proceeds in opposite directions simultaneously, and gas is returned by diffusion from the cartridge 72I to the space below the extension 206. However, such gas cannot diffuse from the space below the extension 206 into the channel 25, because of the current of gas flowing downwardly through the channel 24.

As an example, assume that the gas flowing through the channel 24 contains both water vapor and carbon dioxide, both of which are to be measured. The cartridge 72 may contain a drying agent capable of absorbing water but not carbon dioxide, whereas the cartridge 72I may contain an agent such as ascarite capable of absorbing both water vapor and carbon dioxide. Obviously, the purpose of this arrangement is to deliver dried gas containing its carbon dioxide content to the cells connected to the channel 25 while permitting only gas denuded of both its water vapor and carbon dioxide to enter the cells connected to channel 26. If it were possible for gas that has been in contact with the ascarite in cartridge 72I to reach the channel 25, the gas therein would not contain its normal quota of carbon dioxide and inaccuracy would result.

Usually it is most desirable to transfer gas from the flow channels 24, 25 and 26 to the cells by diffusion, and for this purpose inner diffusion passages in the inner member 20 and outer diffusion passages in the outer member 21 have been previously mentioned with reference to the cross-section of Fig. 3. The vertical arrangement of the inner and outer diffusion passages may be as illustrated in the detail vertical section of Fig. 10. It will be observed from inspection of Fig. 10 that the outer diffusion passage 37a in the member 21 enters the cell 37 near the lower end thereof. This arrangement is desirable because it facilitates drainage from the cell 37 of any liquid that may condense from gas that diffuses into the cell.

It is usually desirable to transfer the gas from the flow channel to the cell by diffusion because this eliminates errors due to loss of heat from the resistor in the cell which results from flow convection. However, in some instances it may be desirable to flow the gas through the cell instead of transferring it by diffusion, and the present apparatus can be readily constructed for such operation.

Thus, as shown in Fig. 11, the outer member 21 can be provided with two flow passages 37I and 372 which extend from the upper and lower ends, respectively, of the cell 37 to the sealing surface 23 of the outer member 21 and are adapted to register with a pair of flow passages 24I and 242 which extend from the channel 24 to the sealing surface 22 of the inner member 20. The normal flow of gas through the channel 24 may be sufficient to induce circulation of gas through the passages 24I and 37I into the upper end of the cell 37, and from the bottom of the cell, through the passages 372 and 242, back to the flow channel 24. However, in some instances it may be desirable to increase the resistance to flow through the channel 24 to increase the circulation of gas through the cell, and this can be done by inserting a bushing 244 in the flow channel between the flow passage 24I and the flow passage 242.

As shown in Figs. 3A and 3B each of the flow channels is connected to two separate inner diffusion passages for connection of the flow channel to two cells simultaneously. However, it is to be understood that this particular construction is not essential and a single large passage can be substituted for the two flow passages connected to each of the flow channels, 24, 25 and 26 in Fig. 3. Such a construction is shown in Fig. 12 where it will be observed that the inner member 20 has recesses 245, 255 and 265 extending from the channels to the sealing surface 22 of the inner member 20 and of sufficient circumferential extent to span two of the outer diffusion passages leading to two different cells. The recesses 245, 255 and 265 may be of limited vertical extent, substantially the same as that of the diffusion passage 24a shown in Fig. 10, or they can extend from above the outer diffusion passages to the lower end of the part 205 (Fig. 4) when the use of back diffusion is not contemplated.

To prevent leakage of atmospheric air between the sealing surfaces of the inner and outer members, an annular groove 80 may be provided in the contact surface 22, and an annular groove 2I may be provided in the contact surface 23, and a sub-ambient pressure can be maintained in these grooves by connecting the groove 8I to the exhaust duct 85. This connection can be effected through a pipe 82, a passage 83 in the outer member 2I, and a passage 84 in the cap 30, the cap being so oriented that the passages 83 and 84 are in registration.

Obviously, the rotatable plug construction enables the comparison of various ones of a plurality of gases and is very useful. However, the construction has advantages aside from the rotatable feature, and for some purposes the parts can be made in one piece or non-rotatable.

A particular advantage of the apparatus is that various reagents can be used in the cartridges 72 and 72I and the reagents can be readily changed and the apparatus cleaned in preparation for a new test.

It is to be understood that although, in the apparatus as shown in the drawing, the test cells are shown in the outer member 2I and the gas channels are shown in the inner member 20, it is possible to reverse the locations of the cells and flow channels. In order to simplify the language of the claims the member containing the flow channels is referred to as the "channel member," the member containing the cells is referred to as the "cell member," the gas passages extending from the cells to the sealing surface of the cell member are referred to as "cell transfer passages," and the passages extending from the flow channels to the sealing surface of the channel member are referred to as "channel transfer passages."

Because of the flexibility resulting from the location of the flow channels 24, 25, 26 (Fig. 3) and the cells 35, 36, 37 and 38 in relatively movable members the apparatus facilitates the introduction of different gases into the cells in relatively rapid succession.

In my co-pending application, Serial No. 676,819, filed June 14, 1946, a system is disclosed in which a diffusion passage is provided between two opposing cells for suppression of sensitivity. The present construction of cell block is well adapted for the provision of such a passage.

Thus, such a diffusion passage may be drilled through the outer member 21 between the recesses therein, which, in part, define the cells 37 and 38, the preferable vertical location of such a passage being indicated in dotted lines at 373 in Fig. 10.

My co-filed application also discloses a system involving four separate flow channels for simultaneously flowing gas to four separate cells and Fig. 13 of the instant drawing shows a modification of Fig. 3A for providing four flow channels 90, 91, 92 and 93 in the inner member 20a instead of three channels. In Fig. 13 the orifices or ports of the passages leading from the flow channels and of the passages leading from the cells are circumferentially spaced 45° apart in the contact surfaces of the inner and outer members instead of 60° as in the construction where three flow channels are employed.

Although for the purposes of explaining the invention certain specific embodiments thereof have been described in detail, various departures from the exact construction shown can be made while still utilizing the invention which is to be limited only to the extent set forth in the appended claims.

What is claimed as new is:

1. Gas analysis apparatus of the type described comprising: a cell member and a channel member relatively movable in sliding engagement with each other and having cooperating contact surfaces adapted for sealing in all positions of relative movement; said cell member defining a test cell and a cell transfer passage extending from said test cell to the contact surface of said cell member, and said channel member defining a flow channel for flow of gas therethrough and a branch channel transfer passage connected at a point intermediate the ends of said flow channel and extending from said flow channel to the contact surface of said channel member at a point thereon in registration with said cell transfer passage in one relative position of said members; and means for flowing gas through said flow channel past the point of connection of said flow channel and said channel transfer passage whereby a portion of the gas flowing through said flow channel is transferred through said branch transfer channel passage to said cell transfer passage when said passages are in register.

2. Apparatus as described in claim 1, in which said cell member defines a plurality of test cells, each having an associated cell transfer passage leading therefrom to said contact surface of the cell member, the orifices of said branch transfer passages lying in a common plane such that different ones thereof can be selectively connected to said channel transfer passage by relative movement of said members.

3. Apparatus as described in claim 1, in which said channel member defines a plurality of flow channels and a plurality of branch channel transfer passages extending from said flow channels to the contact surface of said branch channel member, the orifices of said channel transfer passages lying in a common plane such that different ones thereof can be selectively registered with said cell diffusion passage by relative movement of said members.

4. Gas analysis apparatus of the type described, comprising: relatively movable cell and channel members having cooperating contact surfaces adapted for sealing in all positions of movement, said cell member defining a plurality of test cells and a plurality of cell transfer passages extending from the respective test cells to the contact surface of said cell member and terminating in orifices all lying in a common plane; said channel member defining a plurality of flow channels for flowing gas therethrough and a plurality of branch channel transfer passages connected between the ends of the respective flow channels and extending from said flow channels to the contact surface of said channel member, the orifices of said branch channel transfer passages lying in said common plane, whereby different branch channel transfer passages may be connected with different cell transfer passages by relative movement of said members; and means for connecting at least one of said flow channels between a gas source and an exhaust duct for flowing gas to be tested through said one flow channel whereby a portion of the gas flowing therethrough is transferred through a branch transfer channel passage extending therefrom to a cell transfer passage when in register therewith.

5. Apparatus as described in claim 4, in which two of said branch channel transfer passages extend from the same flow channel and have their orifices so spaced as to register with two of said cell transfer passages in one predetermined position of relative movement between said members, and with only one of said two cell transfer passages in another predetermined position of relative movement.

6. Apparatus as described in claim 4 in which the branch channel transfer passage extending from one of said flow channels has its orifice in the contact surface so dimensioned as to register with two of said cell transfer passages in one predetermined position of relative movement between said members and to register with only one of said cell transfer passages in another predetermined position of relative movement.

7. Apparatus as described in claim 4, in which said cell transfer passages terminate in orifices in said contact surfaces spaced apart equal distances in said common plane and said branch channel transfer passages have their orifices spaced apart the same equal distances, there being two channel transfer passages extending from one of said flow channels whereby it is selectively connectible simultaneously to either of two pairs of said cell transfer passages.

8. Apparatus as described in claim 4 in which said members are rotatable with respect to each other and in which said cell member contains a pair of test cells having the orifices of their associated cell transfer passages spaced 60° apart about the axis of rotation in the contact surface of said cell member; said channel member contains three flow channels with two similar channel transfer passages extending from each flow channel and with the orifices of said channel transfer passages spaced 60° apart in the contact surface of said channel member; whereby one flow channel can be connected to both of said pair of test cells in one position of relative rotation of said members, and any pair of said flow channels can be similarly connected to both of said test cells in other predetermined positions of relative rotation of said members.

9. Apparatus as defined in claim 4, in which said cell member comprises a first part having said contact surface and having a pair of plane outer faces intersecting each other at an edge, and cover plates secured to said plane faces in sealing relation therewith, each plane face and its associated cover plate containing registering recesses defining one of said test cells, said first part of said cell member having an auxiliary passage extending therethrough from the recess in one of said plane faces to the recess in the other plane face.

10. Gas analysis apparatus of the type described comprising: an outer cell member and an inner channel member relatively rotatable with respect to each other and having circumferentially continuous contact surfaces sealing in all positions of rotation, one end of said cell member being open and exposing one end of said channel member and the other end of said cell member being closed and enclosing the other end of said channel member; said cell member defining a test cell and a cell transfer passage extending from said test cell to the contact surface of said cell member, and said channel member defining a flow channel for gas therethrough and a channel transfer passage extending from said flow channel to the contact surface of said channel member at a point therein in registration with said cell transfer passage in one relative position of said members; means for admitting gas to said flow channel at the exposed end of said channel member; means for exhausting gas from the closed end of said cell member; one of said members having a circumferential groove in its contact surface intermediate said channel transfer passage and said one end, and means for exhausting gas from said groove.

11. Gas analysis apparatus of the type described, comprising: relatively movable cell and channel members having cooperating contact surfaces adapted for sealing in all positions of movement, said cell member defining a pair of test cells and a pair of cell transfer passages extending from the respective test cells to the contact surface of said cell member and terminating in orifices all lying in a common plane; said channel member defining a main flow channel for flow of gas therethrough and a first branch channel transfer passage extending from said flow channel to the contact surface of said channel member at a point thereon for registering with one of said cell transfer passages in one relative position of said members; and means for connecting said main flow channel between a gas source and an exhaust duct for flowing gas to be tested through said main flow channel; said channel member also defining an auxiliary flow channel having a second branch channel transfer passage connected to one end thereof, said second branch channel transfer passage terminating in an orifice adapted to register with another of said cell transfer passages when said members are in said one relative position, the other end of said auxiliary channel communicating through a connecting passage to the downstream portion of said flow channel relative to the position of said first mentioned branch channel transfer passage.

12. Apparatus as described in claim 11 including a charge of porous material in said auxiliary flow channel.

13. Gas analysis apparatus of the type described comprising: an outer cell member and an inner channel member relatively rotatable with respect to each other and having cooperating contact surfaces sealing in all positions of rotation; said cell member defining a test cell and a cell transfer passage extending from said test cell to the contact surface of said cell member, and said channel member comprising a flow channel extending therethrough and a branch channel transfer passage connected at a point intermediate the ends of said flow channel and extending from said flow channel to the contact surface of said channel member at a point therein in registration with said cell transfer passage in one position of relative rotation of said members; one end of said cell member being open to expose one end of said channel member and the other end of said cell member being closed; means for effecting direct connection between a source of gas to be tested and the exposed end of said channel member; and means for effecting connection between the closed end of said cell member and an exhaust conduit whereby the gas to be tested flows through said flow channel and a portion of the gas flowing therethrough is transferred through said branch transfer channel passage to said cell transfer passage when said passages are in register and wherein one of said members has an annular groove in its contact surface intermediately said transfer passages and said one end of said member, and means connecting said groove to said exhaust conduit.

WLADIMIR M. ZAIKOWSKY.

REFERENCES CITED

The following references are of record in the file of this patent:

UNITED STATES PATENTS

| Number | Name | Date |
| --- | --- | --- |
| 1,746,425 | Heckert | Feb. 11, 1930 |
| 1,818,619 | Harrison | Aug. 11, 1931 |
| 1,954,681 | Oetjen | Apr. 10, 1934 |
| 2,077,538 | Wait | Apr. 20, 1937 |
| 2,211,627 | Morgan et al. | Aug. 13, 1940 |
| 2,269,850 | Hebler | Jan. 13, 1942 |

FOREIGN PATENTS

| Number | Country | Date |
| --- | --- | --- |
| 578,517 | Germany | June 14, 1933 |